Nov. 30, 1926.  
B. E. DAVIS  
EGG TURNING TRAY  
Filed May 22, 1925

1,608,776

Inventor  
B. E. Davis  
By C. A. Snow & Co.  
Attorneys.

Patented Nov. 30, 1926.

1,608,776

UNITED STATES PATENT OFFICE.

BERT E. DAVIS, OF INDEPENDENCE, IOWA.

EGG-TURNING TRAY.

Application filed May 22. 1925. Serial No. 32,168.

This invention relates to incubators and more particularly to egg trays therefor.

The object of the invention is to so construct an egg tray for incubators that it will automatically turn the eggs by the use of a small lever and without opening the incubator.

Another object is to so construct such a tray as to insure the egg lying in its natural position on the side with the small end a little downward.

Another object is to so construct such a tray as to prevent the eggs crowding against each other and yet conserve space which is accomplished by mismatching the eggs in every other row which brings them closer together without contacting.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

The tray constituting this invention comprises the usual rectangular frame composed of end members 1 and 2 and side members 3 and 4 suitably secured together, the side members being connected by laterally spaced strips 5 which connect their lower edges and form supports between the rollers 6 to prevent the hatching chicks from dropping between the rollers.

Figure 1:
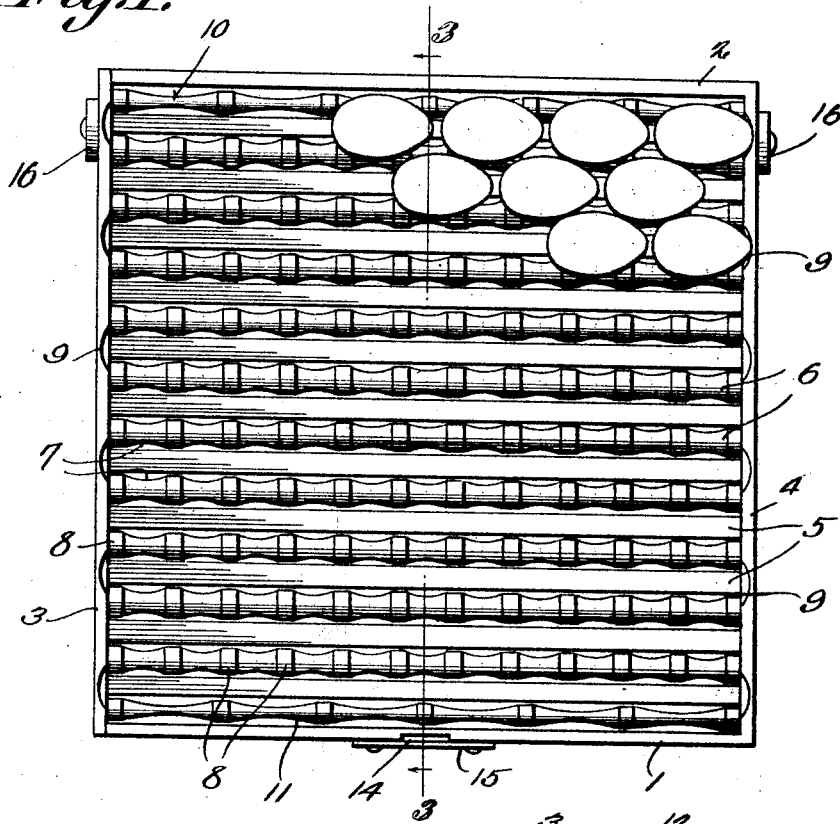
Figure 1 represents a top plan view of an incubator tray constructed in accordance with this invention.

These rollers 6 are designed for supporting and turning the eggs and extend transversely of the tray with their ends journaled in the side members 3 and 4. These rollers 6 have egg receiving seats 7 formed therein, those in one roller arranged opposite those in the next as is shown clearly in Fig. 1. Between the seats 7 is arranged a cylindrical portion 8 which prevents the ends of the eggs from contacting and by arranging the eggs in staggered relation as shown in Fig. 1 the sides thereof are prevented from contacting which is desirable for the reason that infertile eggs or eggs with dead germs do not carry the temperature that those with the live germs do. To conserve space the mismatching of the eggs in the adjacent rows brings the rows closer together without the eggs touching. It will be noted that every other row has one less egg and the end members of the tray are notched or recessed as shown at 9 to accommodate more eggs. At the ends of the tray two smaller rollers 10 and 11 are provided which also assist in economizing in space, the use of them at this point saving about one inch tray space.

Figure 2:
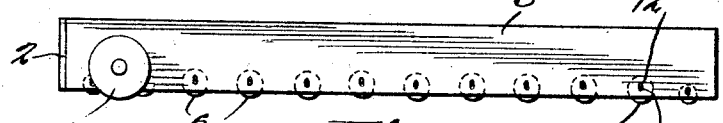
Fig. 2 is a side elevation thereof.
Figure 3:
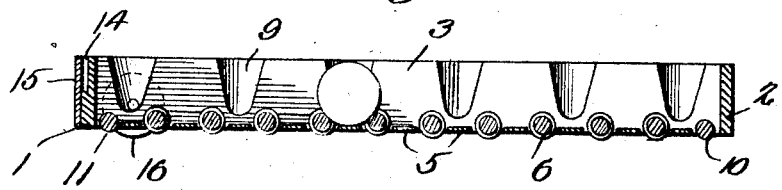
Fig. 3 is a transverse section.

The side members 3 and 4 of the tray are equipped with transversely arranged oblong bearing openings 12 to receive the pintles 13 carried by the ends of the rollers which ensures the rollers bearing always on their track, even though the track, the frame or the rollers should be warped. This arrangement of rollers in connection with the frame as shown in Fig. 2 permits the rollers to normally extend below the bottom edges of the frame so that when the tray rests on a flat surface the back and forward movement thereof will cause the rollers to turn and carry with them the eggs resting thereon thereby simultaneously turning all of the eggs according to the distance which the tray is moved.

The front member 1 is shown equipped with a cut out portion 14 over which is arranged a wear resisting plate 15. This recess 14 is designed to receive an operating lever, not shown, which extends downwardly through the incubator top into this opening and is movable back and forth so that the tray may be moved back and forth without opening the incubator.

This recess 14 also provides a hand hold in case it is desired to move the tray back and forth by hand on the opening of the door, and for lifting the tray when desired.

The tray is preferably provided at its inner end on the side members 3 and 4 thereof with wheels 16, the peripheries of which project below said side members and which are designed to prevent the eggs from spinning when the tray is pulled out or pushed in. This is accomplished by lifting up the outer end of the tray and letting it roll entirely on the wheels 16 as will be obvious.

This egg turning tray effects a great saving in time since to turn the eggs it is only necessary to move the tray slightly in one direction or the other and the turning movement of said eggs will be controlled by the extent of movement of the tray.

The arrangement of the seat 7 in the rollers 6 provides for the proper positioning of the eggs on the side thereof with the small ends a little downward.

It might be stated that the incubator with which this tray is employed is provided with substantially wide track sections adjacent to the side walls thereof, which track sections are provided with notches at their inner ends in which the rollers 16 drop, when the tray has been forced inwardly to its proper position, thereby allowing the rollers 6 to drop onto the track sections in such a way that further movement of the tray will result in rotary movements of the rollers to turn the eggs.

When it is desired to remove the tray, the forward end of the tray is elevated slightly whereupon the wheels 16 support the tray in such a way that the rollers may not contact with the track sections during this movement of the tray.

Obviously the turning of the eggs may be effected by moving the tray back and forth or by fixing the tray and moving the track on which the rollers rest back and forth.

The strips 5 which are arranged between the rollers are of sufficient width to prevent the chicks from falling between or getting lodged in between the rollers.

I claim:—

1. An egg turning tray comprising a frame having a plurality of rollers mounted therein with their peripheries extending below the bottom edges of the frame and equipped with seats for retaining the eggs in operative position.

2. An egg turning incubator tray comprising a frame, egg supporting rollers revolubly mounted therein, and provided in their opposed faces with egg receiving seats, portions of said rollers extending below the lower edges of said frame, chick retaining strips located between said rollers and spaced slightly therefrom, and means for permitting the rollers to move up and down in said frame.

3. An egg turning tray comprising a frame having a plurality of rollers mounted therein with their peripheries extending below the bottom edges of the frame and equipped with seats for retaining the eggs in operative position, said frame being equipped at one end with wheels extending below the lower edges of the frame to permit the frame to be moved without spinning the eggs.

In testimony that I claim the foregoing as my own, I have hereto affixed my signature.

BERT E. DAVIS.